United States Patent [19]

Weaver et al.

[11] 4,029,829

[45] May 14, 1977

[54] FRICTION MEMBER

[75] Inventors: John Victor Weaver, Water Orton; Ronald Fisher, Hillmorton Rugby, both of England

[73] Assignee: Dunlop Limited, London, England

[22] Filed: Jan. 27, 1975

[21] Appl. No.: 544,575

[30] Foreign Application Priority Data

Feb. 8, 1974 United Kingdom ............ 05791/74

[52] U.S. Cl. .............................. 427/44; 423/447.3; 423/448; 423/458; 427/50; 427/112; 427/113; 427/122; 427/228; 427/249; 428/218; 428/368; 428/408; 428/409; 428/902

[51] Int. Cl.$^2$ .................. C01B 31/04; C23C 11/10; B32B 5/02

[58] Field of Search .......... 428/367, 368, 218, 408, 428/409, 902; 427/12, 44, 50, 113, 112, 122, 228, 249; 423/445, 447.1–447.9, 448, 458, 460

[56] References Cited

UNITED STATES PATENTS

| | | | |
|---|---|---|---|
| 1,884,600 | 10/1932 | Derby | 423/448 X |
| 2,554,548 | 5/1951 | Albagnac | 428/408 X |
| 3,072,558 | 1/1963 | Myers et al. | 204/280 |
| 3,084,394 | 4/1963 | Bickerdike et al. | 428/408 X |
| 3,369,920 | 2/1968 | Bourdeau et al. | 427/249 |
| 3,462,289 | 8/1969 | Rohl et al. | 428/408 X |
| 3,549,847 | 12/1970 | Clark et al. | 428/408 X |
| 3,552,533 | 1/1971 | Nitz et al. | 192/107 |
| 3,607,368 | 9/1971 | Amstel | 427/50 |
| 3,607,541 | 9/1971 | Tombrei | 156/280 |
| 3,657,061 | 4/1972 | Carlson et al. | 428/408 X |
| 3,715,253 | 2/1973 | Olcott | 423/447.3 X |
| 3,720,575 | 3/1973 | Cowlard | 428/408 |
| 3,855,174 | 2/1974 | Brie et al. | 428/367 X |
| 3,912,832 | 10/1975 | Araki et al. | 427/249 X |
| 3,922,412 | 11/1975 | Yoshikawa et al. | 428/408 X |
| 3,925,577 | 12/1975 | Fatzer | 428/408 |
| 3,925,587 | 12/1975 | Park | 428/408 X |
| 3,927,241 | 12/1975 | Augustin | 428/367 X |
| 3,944,686 | 3/1976 | Froberg | 427/249 X;228 |
| 3,964,952 | 6/1976 | Brie et al. | 423/447 X |
| 3,969,130 | 7/1976 | Bokros | 428/368 X |
| 3,971,669 | 7/1976 | Wrzesien et al. | 428/367 X |
| 3,980,105 | 9/1976 | Myskowski | 428/408 X |
| 3,991,248 | 11/1976 | Bauer | 427/249 X |

FOREIGN PATENTS OR APPLICATIONS 1,223,080 2/1971 United Kingdom

*Primary Examiner*—Harold Ansher
*Attorney, Agent, or Firm*—Stevens, Davis, Miller & Mosher

[57] ABSTRACT

The invention provides a more economical carbon-fiber-reinforced carbon surfaced friction member, such as a brake disc, by replacing a disc which is of fiber-reinforced carbon throughout its thickness by a disc in which a fiber-reinforced surface layer is bonded to a base of a less expensive material, such as bulk graphite. A textile may be applied to the base and carbonized and carbon deposited on the textile layer by the multiple impregnation process or the chemical vapor deposition process. In the latter process the base is preferably heated above the temperature of the textile layer, e.g. by electrical induction or resistance, to obtain carbon deposition from the base outward through the textile layer.

6 Claims, No Drawings

FRICTION MEMBER

The present invention relates to a friction member having an all-carbon surface layer reinforced by carbon fibers and method of manufacturing the same.

In recent years there has been increasing use of carbon as or in friction members which will be subjected to great heat in use, such as in a disc brake for an aircraft or high speed train, because of the suitability of carbon as a heat sink and its resistance to thermal shock.

It has been proposed to use all-carbon, carbon-fiber-reinforced friction and/or heat sink members, the material being produced either by the "multiple impregnation" process wherein layers of cloth or felt, which may be precarbonized are subjected to repeated impregnation with resin and charring to carbonize the resin, or the textile fibers and the resin until a carbon fiber reinforced carbon composite is obtained, or by the "chemical vapor deposition" process wherein a carbonized textile fiber article comprising layers of graphite cloth or felt is heated in gaseous mixtures containing hydrocarbon gases whereby cracking of the mixture causes deposition and build-up of carbon on the carbonized textile fiber to produce the fiber reinforced composite material.

This fiber reinforced composite material has favorable performance characteristics by comparison with other solid carbon materials, such as bulk graphite, but it has the disadvantage of high cost so that, for example, an aircraft brake disc consisting solely of carbonized textile fiber reinforced carbon is very expensive.

Such thick objects are also difficult to manufacture, especially by the chemical vapor deposition process, because the carbon deposited tends to densify first on the outer surfaces of the isothermally heated textile material and forms a layer which impedes penetration of gases to give a build-up of carbon in sufficient density through the full thickness of the textile material, giving rise to a very protracted manufacturing process.

One object of the present invention is to reduce the cost of thick, carbon-surfaced or all-carbon friction materials, such as aircraft or railway brake discs, without sacrificing the advantages of carbon-fiber-reinforced carbon material as part of a friction couple.

In accordance with the present invention there is provided a method of producing a friction member which has an all-carbon friction surface comprising a layer of carbon fibers, the method comprising applying a porous layer of carbon or comprizable fibrous material in discrete and/or textile form to at least one surface of a non-porous base or body with the interposition of a comprizable resin or pitch, curing the comprizable resin or pitch to bond the layer to said base or body, heating at least the base or body and subjecting at least the layer to a chemical densification process (as above defined) to produce a friction surface in the form of an all-carbon layer reinforced by carbon fibers and bonded by carbon to the base or body.

In accordance with a preferred feature of the present invention the base or body may be maintained at a higher temperature than the material of the layer during the chemical vapor deposition process whereby carbon is deposited in greatest concentration initially adjacent the hotter base or body surface and builds therefrom progressively through the fibrous layer to the exposed surface of the layer. This is in contrast to the conventional isothermal technique wherein carbon is deposited in greatest concentration initially at the exposed surface of the layer and this impedes penetration of the layer by surface-deposited carbon requiring a relatively much more prolonged treatment, because of intermediate machining stages, to obtain full carbon densification throughout the thickness of the fibrous layer.

The base or body defined in the two immediately preceding paragraphs is preferably of carbon material such as bulk graphite so that the method of the invention results in an all-carbon article having at least one surface layer of carbon fiber reinforced carbon.

Maintenance of the base or body at a temperature higher than that of the fibrous layer can be achieved in any suitable manner. The unfinished article comprising a fibrous layer bonded by a carbonized resin to the base or body can be subjected to high frequency electrical induction heating to which a bulk graphite base or body is more susceptible than the fibrous material with the result that the base or body rises to and remains at a higher temperature than the layer during chemical vapor deposition.

Alternatively, unequal heating of the base or body may be achieved by passing an electric current through the latter so that its resistance causes it to be heated.

The carbonizable resin is preferably of the phenolic type, having a char yield of more than 50%, preferably 60%, at 1,000° C. The resin preferably has the following characteristics:

| | | |
|---|---|---|
| Specific gravity at 25° C. | — | 1.115 |
| Viscosity at 25° C. | — | 800 cS |
| Resin content at 135° C. | — | 60% |
| Gelation time at 150° C. | — | 180 seconds |

It is preferably soluble in industrial methylated spirits.

An all-carbon article in accordance with the invention is suitable as a combined friction and heat sink element in a brake or clutch. In a disc brake for an aircraft or high speed train each brake disc may be a unitary article made in accordance with the present invention, or articles in accordance with the present invention may be incorporated as friction pads and/or heat sink elements in a brake disc construction which includes support means for the elements for example in the form of a metal or carbon frame or spider.

The invention is illustrated by the following examples:

EXAMPLE I

One sheet of polyacrylonitrile precursor carbon cloth was attached to one surface of a block of fine-grained high density pitch - impregnated electrographite using a 10% by weight-to-volume solution in acetone of a phenolic resin having the above properties. The resin was cured under a light pressure (in the range from 5 pounds per square inch to 100 p.s.i.) at a temperature of 160° C. and subsequently carbonized in an inert atmosphere to effectively bond the sheet to the block. The unfinished article thus produced was isothermally heated in a gaseous mixture of methane and argon under reduced pressure for 96 hours such that carbon was deposited throughout the cloth to a substantially uniform density of 1.65 gm/cm$^3$.

EXAMPLE II

All details of this Example were the same as Example I except that several layers of cloth were bonded to the block surface. Densification of 1.68 gm/cm$^3$ throughout the cloth layers was achieved. The details for bonding felt layers to the surface of the block are essentially the same as for cloth layers, except that it is preferably to use 20% weight-to-volume resin solution because of absorption by the bulk of the felt.

EXAMPLE III

All details are essentially the same as for Examples I and II, except that the cloth to be used as a single or multiple layer is first pre-impregnated using a 10% weight-to-volume of resin which is sprayed onto the cloth which is held as a flat sheet. This stiffens the cloth making it more amenable to cutting without fraying and also inhibits soaking up of resin applied to the block for bonding purposes.

EXAMPLE IV

All details of this Example were the same as Example I except that rayon precursor cloth (Hitco G.1550) was used in place of the polyacrylonitrile precursor cloth resulting in deposition of carbon substantially uniformly throughout the layer to a density of 1.66 gm/cm$^3$.

EXAMPLE V

A piece of polyacrylonitrile precursor felt was placed between two pieces of polyacrylonitrile precursor cloth and the superimposed cloth and felt applied to one surface of a block of British Acheson's ATJ graphite with the interposition of a phenolic resin having the above characteristics. The resin was cured and carbonized and the unfinished article subjected to isothermal heating in a chemical vapor deposition process performed in accordance with Example I resulting in an all-carbon article in which the carbon density in the fiber reinforced carbon layer was 1.73 gm/cm$^3$.

EXAMPLE VI

A piece of polyacrylonitrile precursor felt was applied to one surface of a block of British Acheson's ATJ graphite with the interposition of a phenolic resin having the above characteristics. The resin was cured under light pressure and subsequently carbonized in an inert atmosphere to bond the felt to the block. The unfinished article thus produced was subjected to high frequency electrical induction heating in a gaseous mixture of methane and nitrogen for a period of 18 hours, resulting in carbonizing of the felt and deposition of carbon throughout the felt to a substantially uniform density of 1.77 gm/cm$^3$.

In this Example a very much shorter time was required, relative to the previous Examples, to achieve a greater carbon densification. This was attributable to the graphite block having a higher temperature than the felt during the chemical vapour deposition process. This resulted in a greater densification of deposited carbon initially adjacent the graphite block, the deposited carbon forming a front which moved progressively through the textile layer to the exposed surface of the latter.

By firmly bonding a fiber reinforced carbon layer to a graphite block a friction element can be produced which is very much cheaper than a carbon element which is fiber reinforced throughout its thickness without sacrificing the friction properties of textile fiber-reinforced; and carbon for the friction surface of the element.

Furthermore by the use of a non-isothermal deposition technique, for example as disclosed in Example IV, a more rapid and efficient production method than has hitherto been possible is provided for an all-carbon article having a fiber-reinforced surface layer.

Having now described our invention What we claim is:

1. A method of manufacturing an all-carbon friction member which comprises applying to at least one side of a graphite body a layer of carbon fibers with the interposition of a carbonizable resin, curing the resin to bond the layer to the body and subjecting the layer to a chemical vapor deposition process in which the layer is heated in the presence of a hydrocarbon gas whereby carbon is densified on the layer by cracking of the gas and the body is maintained at a higher temperature than the material of the layer during the chemical vapor deposition process whereby carbon is deposited in greatest concentration initially adjacent the hotter body surface and builds therefrom progressively through the fibrous layer to the exposed surface of the layer to form a friction surface on said side of said body.

2. A method as claimed in claim 1, wherein the unfinished article comprising a fibrous layer bonded by a carbonized resin to the body is subjected to high frequency electrical induction heating to which the body is more susceptible than the fibrous material with the result that the body rises to and remains at a higher temperature than the layer during the chemical vapor deposition process.

3. A method as claimed in claim 1, wherein the body is raised to a higher temperature than the layer during the chemical vapor deposition process by passing an electric current through the body so that the resistance of the latter causes it to be heated.

4. A method as claimed in claim 1, wherein the carbonizable resin used is of the phenolic type, having a char yield of more than 50% at 1,000° C.

5. A method as claimed in claim 4, wherein the

| | | |
|---|---|---|
| Specific gravity at 25° C. | — | 1.115 |
| Viscosity at 25° C. | — | 800 cS |
| Resin content at 135° C. | — | 60% |
| Gelation time at 150° C. | — | 180 seconds | carbonizable resin has the following charactreristics:

6. A method as claimed in claim 4 wherein the carbonizable resin used is soluble in industrial methylated spirits.

* * * * *

UNITED STATES PATENT OFFICE
CERTIFICATE OF CORRECTION

Patent No. 4,029,829  Dated June 14, 1977

Inventor(s) John Victor Weaver et al.

It is certified that error appears in the above-identified patent and that said Letters Patent are hereby corrected as shown below:

On the cover page Item [45] "May 14, 1977" should read -- June 14, 1977 --.

Signed and Sealed this

Fourth Day of October 1977

[SEAL]

Attest:

RUTH C. MASON
Attesting Officer

LUTRELLE F. PARKER
Acting Commissioner of Patents and Trademarks